United States Patent
Ohishi et al.

(10) Patent No.: US 6,783,825 B1
(45) Date of Patent: Aug. 31, 2004

(54) RESIN-METAL LAMINATES

(75) Inventors: Hiroshi Ohishi, Futtsu (JP); Masahiro Kumagai, Futtsu (JP); Nobuo Kadowaki, Tokai (JP); Keiko Kawakami, Futtsu (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 09/555,199

(22) PCT Filed: Nov. 26, 1998

(86) PCT No.: PCT/JP98/05331

§ 371 (c)(1),
(2), (4) Date: Jun. 27, 2000

(87) PCT Pub. No.: WO99/27026

PCT Pub. Date: Jun. 3, 1999

(30) Foreign Application Priority Data

| | | |
|---|---|---|
| Nov. 26, 1997 | (JP) | 9-324581 |
| Feb. 26, 1998 | (JP) | 10-045704 |
| Mar. 23, 1998 | (JP) | 10-074556 |

(51) Int. Cl.[7] ............................................. C09D 133/06
(52) U.S. Cl. ..................... 428/35.7; 428/36.8; 428/327; 428/332
(58) Field of Search ........................ 428/35.7, 36.8, 428/327, 332, 35.1

(56) References Cited

U.S. PATENT DOCUMENTS

| | | | |
|---|---|---|---|
| 4,096,202 A | 6/1978 | Farnham et al. | 260/873 |
| 4,219,628 A | 8/1980 | Weemes et al. | 523/166 |
| 4,476,274 A | * 10/1984 | Liu | 524/445 |
| 4,607,075 A | 8/1986 | Baum et al. | 524/449 |
| 4,629,750 A | 12/1986 | Hepp | 523/201 |
| 4,659,767 A | 4/1987 | Dunkle et al. | 524/504 |
| 5,055,513 A | * 10/1991 | Banford et al. | 524/433 |
| 5,237,004 A | * 8/1993 | Wu et al. | 525/85 |
| 5,539,018 A | * 7/1996 | Luhmann et al. | 523/201 |

FOREIGN PATENT DOCUMENTS

| | | |
|---|---|---|
| EP | 0256 391 A2 * | 2/1888 |
| EP | 0 180 472 | 5/1986 |
| EP | 0 388 388 | 9/1990 |
| EP | 0 472 418 | 2/1992 |
| EP | 0 653 461 | 5/1995 |
| JP | 59-30743 | 7/1984 |
| JP | 60-52179 | 11/1985 |
| JP | 62-91573 | 4/1987 |
| JP | 8-1864 | 1/1996 |

OTHER PUBLICATIONS

Patent Abstracts of Japan, vol. 002, No. 117 (C–023), Sep. 29, 1978; JP 53 081530 A (Toray Ind. Inc.), Jul. 19, 1978.
Patent Abstracts of Japan, vol. 1996, No. 5, May 31, 1996; JP 08–001864 (Nippon Steel Corporation), Jan. 9, 1996.

* cited by examiner

*Primary Examiner*—Sandra M. Nolan
(74) *Attorney, Agent, or Firm*—Kenyon & Kenyon

(57) ABSTRACT

A resin composition for coating a metal sheet comprising a polyester resin (A) having an intrinsic viscosity of 0.5–2.0 dl/g, an elastomer resin (B) and a vinyl polymer (C) containing at least 1 wt % of a unit with a polar group, and having a structure wherein the elastomer resin (B) is finely dispersed in the polyester resin (A) and at least a portion of the elastomer resin (B) is capsulated by the vinyl polymer (C). Also, metal-sheet-coating resin films using the resin composition, resin-coated metal sheets coated with the resin film, and resin-coated metal containers made by molding the resin-coated metal sheets are disclosed.

30 Claims, 2 Drawing Sheets

RESIN-METAL LAMINATES

TECHNICAL FIELD

The present invention relates to a resin composition for coating a metal sheet with excellent impact strength, chemical resistance, moldability, heat resistance and gas barrier properties, and satisfactory adhesion to metals. The invention further relates to a resin film for coating a metal sheet employing the resin composition, to a resin-coated metal sheet prepared by coating the resin film onto one or both sides of a metal sheet by single layer or multilayer lamination, and to a resin-coated metal container made by molding the resin-coated metal sheet.

BACKGROUND ART

Polyester resins are widely used as coating materials for metal sheets for the purpose of corrosion inhibition, because of their excellent mechanical properties, electrical properties, heat resistance, gas barrier properties and adhesion with metals.

However, since the metal adhesion, impact strength and gas barrier properties of a polyester resin are strongly dependent on its degree of crystallization, the desired properties cannot be achieved without strict control of the crystal structure inside the coating. Specifically, it is necessary to reduce the crystallization degree at the resin interface that contacts the metal in order to achieve good adhesion, while increasing the crystallization at the other sections in order to ensure impact strength and gas barrier properties; it has therefore been necessary to provide a suitable gradient of crystallization inside the coating that can simultaneously satisfy the adhesion, impact strength and gas barrier properties. AS a result, the conditions for the lamination step have been severely restricted.

As one means of overcoming these disadvantages of polyester resins, Japanese Unexamined Patent Publication HEI No. 3-269074 has disclosed a method of laminating a resin composition comprising a crystalline polyester resin and an amorphous polyester resin. While this method allows improved adhesion since the degree of crystallization can be easily lowered at the interface during the lamination step, it also reduces the gas barrier properties and impact strength, and the expression of both properties has required restrictions in the steps, such as using a biaxially stretched film to actively retain crystallization.

Also, Japanese Unexamined Patent Publication HEI No. 7-195617 discloses a technique for lamination of a metal sheet with a coating comprising a composition that contains a polyester resin and an ionomer resin. Since this technique can maintain impact strength even with a lower degree of crystallization, it can provide both adhesion and impact strength; however, it has not been able to achieve sufficient improvement in impact strength at low temperatures.

Furthermore, Japanese Unexamined Patent Publication HEI No. 7-290643 and Japanese Unexamined Patent Publication HEI No, 7-290644 disclose techniques wherein a three-component composition of a polyester resin, ionomer resin and polyester elastomer is used as the coating for a metal sheet. These techniques, however, while providing some improvement in impact strength at low temperatures and impact strength at room temperature, have not allowed improvement to a sufficient level.

In Japanese Unexamined Patent Publication SHO No. 58-17148 there is disclosed a polyester composition containing an aromatic polyester with a specific glycidyl group-containing copolymer and a specific ethylenic copolymer. However, this patent does not disclose or suggest a resin coating structure, forming the basis of the present invention, whereby an elastomer resin capsulated by a polar group-containing resin is dispersed in a polyester resin. Moreover, the composition disclosed in this patent is a resin composition used to obtain molds by injection molding or extrusion molding, and therefore differs substantially from the metal sheet coating resin film of the present invention in terms of its purpose of use.

It is therefore an object of the present invention to provide a resin composition for coating a metal sheet that exhibits not only excellent impact strength, chemical resistance, moldability, heat resistance and gas barrier properties, but also excellent adhesion with metals.

It is another object of the invention to provide a resin film for coating a metal sheet employing the resin composition, to provide a resin-coated metal sheet coated with a resin coating of the laminated resin film, and to provide a resin-coated metal container formed by molding the resin-coated metal sheet.

DISCLOSURE OF THE INVENTION

Specifically, the invention relates to a resin composition for coating a metal sheet characterized by comprising a polyester resin (A) having an intrinsic viscosity of 0.5–2.0 dl/g, an elastomer resin (B) and a vinyl polymer (C) containing at least 1 wt % of a unit with a polar group, and having a structure wherein the elastomer resin (B) Yes finely dispersed in the polyester resin (A) and at least a portion of the elastomer resin (B) is capsulated by the vinyl polymer (C); it further relates to a resin composition for coating a metal sheet comprising 1–50 parts by weight of an elastomer resin (B) and 1–50 parts by weight of a vinyl polymer (C) with respect to 100 parts by weight of a polyester resin (A), wherein the sphere equivalent diameter of the elastomer resin (B) finely dispersed in the polyester resin (A) is no greater than 1 µm.

The invention still further relates to a resin composition for coating a metal sheet wherein the polyester resin (A) is composed of an acid component comprising 50–95 mole percent of terephthalic acid and 50–5 mole percent of isophthalic acid and/or orthophthalic acid, and a diol component comprising a glycol of 2–5 carbon atoms. It still further relates to a resin composition for coating a metal sheet wherein the elastomer resin (B) is a polyolefin resin, and the polyolefin resin is a copolymer of ethylene and an α-olefin of 3 or more carbon atoms, or a terpolymer comprising ethylene, an α-olefin of 3 or more carbon atoms and a non-conjugated diene. It still further relates to a resin composition for coating a metal sheet wherein the vinyl polymer (c) is an ionomer resin.

The invention further relates to a resin composition for coating a metal sheet wherein the elastomer resin (B) and vinyl polymer (C) form a core-shell type elastomer, x,ith the elastomer resin (B) as the core and the vinyl polymer (C) as the shell; it still further relates to a resin composition for coating a metal sheet wherein the vinyl polymer (C) is an acrylate-based polymer, and units containing epoxy groups or aromatic polyester bonds are introduced into the acrylate-based polymer at no greater than 15 wt % with respect to the acrylate units.

The present invention further relates to a resin film for coating a metal sheet formed by laminating the aforementioned resin composition, either alone or in combination with another resin composition and/or adhesive, it even still further relates to a resin-coated metal sheet obtained by coating the metal-sheet-coating resin film onto one or both sides of a metal sheet in a single layer or multilayer form, and it yet still further relates to a resin-coated metal container made by molding the resin-coated metal sheet.

BRIEF DESCRIPTION OF THE DRAWINGS

FIG. 1 shows a case with a single layer laminated on one side and FIG. 2 a case with a single layer laminated on both sides, where 1 is the metal sheet, and 2 and 3 are resin films of the invention. In FIG. 3, 1 is the metal sheet, 2 s a multilayer resin film and 2-1 to 2-3 are the respective resin films forming the multilayer film; one or more of the resin films 2-1 to 2-3 may be resin films according to the invention, and 3 is a resin film on the opposite side; the resin film 3 may be a resin film according to the invention or a different type of resin film.

BEST MODE FOR CARRYING OUT THE INVENTION

Figure 1:
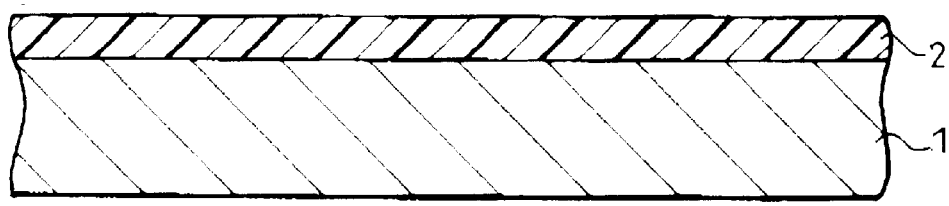
FIGS. 1 to 3 are illustrations of resin-coated metal sheets according to the invention.
Figure 2:
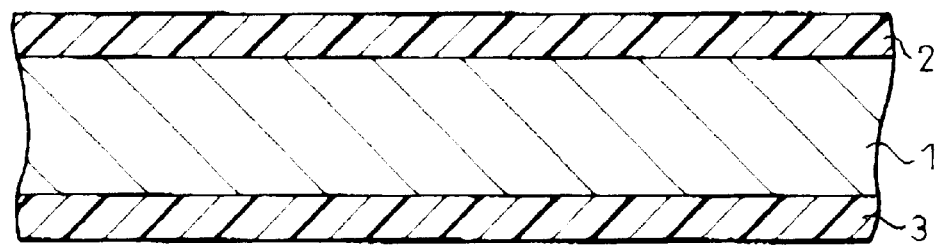
Figure 3:
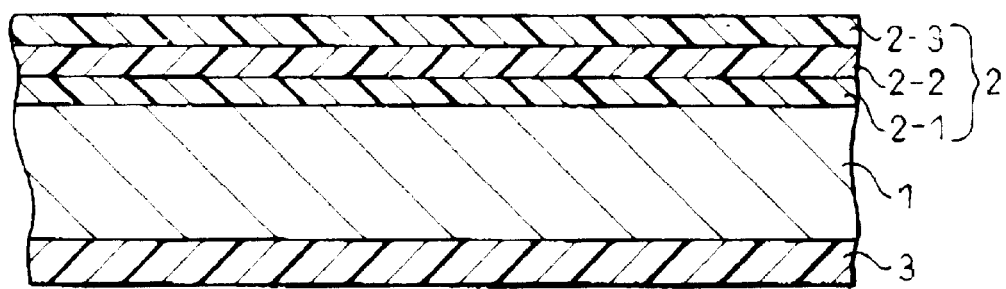
Figure 4:
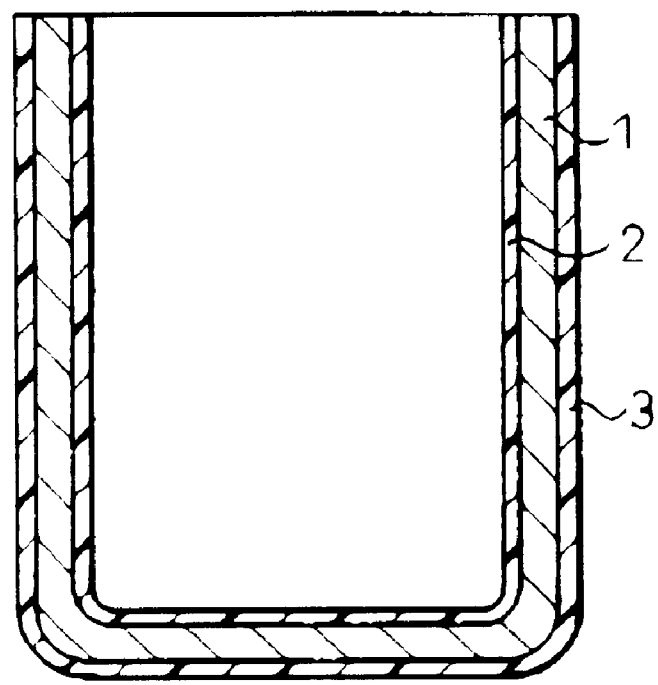
FIG. 4 shows a container molded by drawing using a resin-film-coated metal sheet such as shown in FIG. 2. Here, 1 is the metal sheet and 2 and 3 are resin films.

The resin composition for coating a metal sheet, the resin film employing it, the resin-coated metal sheet and the resin-coated metal container according to the invention will now be explained.

The resin composition for coating a metal sheet of the invention comprises a polyester resin (A) having an intrinsic viscosity of 0.5–2.0 dl/g, an elastomer resin (B) and a vinyl polymer (C) containing at least 1 wt % of a unit with a polar group, and it must have a structure wherein the elastomer resin (B) is finely dispersed in the polyester resin (A) and at least a portion of the elastomer resin (B) is capsulated by the vinyl polymer (C).

Here, "finely dispersed" is a condition in which the elastomer resin (B) is dispersed in the polyester resin (A) at a sphere equivalent diameter of no greater than 100 μm. If the sphere equivalent diameter of the elastomer resin (B) exceeds 100 μm, it becomes difficult to work the resin composition of the invention into a film. The sphere equivalent diameter is preferably no greater than 1 μm, and more preferably no greater than 0.5 μm. At greater than 1 μm, it is sometimes not possible to exhibit sufficient impact strength.

The elastomer resin (B) being capsulated by the vinyl polymer (C) is a structure wherein at least 80%, and preferably at least 95%, of the interface of the elastomer resin (B) is covered by the vinyl polymer (C), and the area of direct contact between the polyester resin (A) and the elastomer resin (B) is less than 20%. With this type of structure, the vinyl polymer (C) provides adhesion with the metal sheet even if the elastomer resin (B) contacts the metal sheet, and therefore adhesion between the resin composition and the metal sheet can be guaranteed.

It is not necessary for the entirety of the elastomer resin (B) to be capsulated by the vinyl polymer (C), and it is sufficient if at least 70% of the volume of the elastomer resin (B) is capsulated by the vinyl polymer (C). When greater than 30% of the volume of the elastomer resin (B) is not capsulated, the proportion of the elastomer resin (B) in direct contact with the metal sheet will increase when the resin composition is used to coat the metal sheet, and therefore it will no longer be possible to guarantee adhesion between the resin composition and the metal sheet. The sphere equivalent diameter of the non-capsulated elastomer resin (B) is not particularly restricted, but from the standpoint of impact strength and workability, it is preferably no greater than 0.5 μm.

The excess vinyl polymer (C) that does not capsulate the elastomer resin (B) may be dispersed alone in the polyester resin (A). The amount and size of the non-capsulating vinyl polymer (C) is not particularly restricted, but it is preferably no more than 20% in terms of volume ratio to the total vinyl polymer (C), with a sphere equivalent diameter of no greater than 0.5 μm. With a volume ratio of greater than 20%, the fundamental properties such as the heat resistance of the resin composition can sometimes be altered. With a sphere equivalent diameter of greater than 0.5 μm, the workability is sometimes lowered.

The resin composition for coating a metal sheet of the invention may have the structure described above and its composition is not otherwise restricted, but it is preferably a resin composition for coating a metal sheet comprising 1–50 parts by weight of an elastomer resin (B) and 1–50 parts by weight of a vinyl polymer (C) with respect to 100 parts by weight of a polyester resin (A). If the elastomer resin (B) is present at less than 1 part by weight it may not be possible to impart sufficient impact strength, and if it is present at greater than 50 parts by weight the heat resistance may be reduced. If the vinyl polymer (C) is present at less than 1 part by weight it may not be able to adequately capsulate the elastomer resin (B), and if it is present at greater than 50 parts by weight the heat resistance may be reduced.

The polyester resin (A) used for the invention has an intrinsic viscosity of 0.5–2.0 dl/g, preferably 0.65–1.7 dl/g, and more preferably 0.8–1.5 dl/g. If the intrinsic viscosity is less than 0.5 dl/g it will not uniformly mix with the elastomer resin (B) and the polar monomer-containing vinyl polymer (C), thus leading to lower mechanical strength and impact strength, while if the intrinsic viscosity is greater than 2.0 dl/g the moldability will be poor, and thus neither situation is desirable.

The intrinsic viscosity is determined by measurement according to the following formula (i) at a 0.5% concentration in o-chlorophenol at 25° C. In the formula, C represents the concentration in terms of number of grams of resin per 100 ml of solution, $t_0$ represents the flow time of the solvent, and t represents the flow time of the solution.

$$\text{Intrinsic viscosity} = \{1n(t/t_0)\}/C \qquad (i)$$

The polyester resin (A) used for the invention is a thermoplastic polyester having as the structural unit only a hydroxycarboxylic acid compound residue, or a dicarboxylic acid residue and a diol compound residue, or a hydroxycarboxylic acid compound residue and a dicarboxylic acid residue and diol compound residue. Mixtures of these are also included.

As examples of hydroxycarboxylic acid compounds to be used as starting materials for hydroxycarboxylic acid compound residues there may be mentioned p-hydroxybenzoic acid, p-hydroxyethylbenzoic acid and 2-(4-hydroxyphenyl)-2-(4'-carboxyphenyl)propane, and these may be used alone or in mixtures of two or more.

As examples of dicarboxylic acid compounds that form dicarboxylic acid residues there may be mentioned aromatic dicarboxylic acids such as terephthalic acid, isophthalic acid, orthophthalic acid, 1,4-naphthalenedicarboxylic acid, 2,3-naphthalenedicarboxylic acid, 2,6-naphthalenedicarboxylic acid, 2,7-naphthalenedicarboxylic acid, diphenic acid, diphenyldicarboxylic acid and diphenoxyethanedicarboxylic acid; aliphatic dicarboxylic acids such as adipic acid, pimelic acid, sebacic acid, azelaic acid, decanedicarboxylic acid, malonic acid, succinic acid, malic acid and citric acid; and alicyclic dicarboxylic acids such as cyclohexanedicarboxylic acid, any two or more of which may be used in admixture.

As examples of diol compounds that form diol residues there may be mentioned aromatic diols such as 2,2'-bis(4-hydroxyphenyl)propane (hereunder abbreviated to "bisphenol A"), bis(4-hydroxyphenyl)methane, bis(2-hydroxyphenyl)methane, o-hydroxyphenyl-p-hydroxyphenylmethane, bis(4-hydroxyphenyl)ether, bis(4-hydroxyphenyl)sulfone, bis(4-hydroxyphenyl)sulfide, bis(4-hydroxyphenyl)sulfone, bis(4-hydroxyphenyl)ketone, bis(4-hydroxyphenyl)diphenylmethane, bis(4-hydroxyphenyl)-p-diisopropylbenzene, bis(3,5-dimethyl-4-hydroxyphenyl)methane, bis(3-methyl-4-hydroxyphenyl)methane, bis(3,5-dimethyl-4-hydroxyphenyl)ether, bis(3,5-dimethyl-4-hydroxyphenyl)sulfone, bis(3,5-dimethyl-4-hydroxyphenyl)sulfide, 1,1-bis(4-hydroxyphenyl)ethane, 1,1-bis(3,5-dimethyl-4-hydroxyphenyl)ethane, 1,1-bis(4-hydroxyphenyl)cyclohexane, 1,1-bis(4-hydroxyphenyl)-3,3,5-trimethylcyclohexane, 1,1-bis(4-hydroxyphenyl)-1-phenylethane, 1,1-bis(4-hydroxyphenyl)-1-phenylmethane, 2,2-bis(4-hydroxyphenyl)propane, 2,2-bis(4-hydroxyphenyl)butane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, 2,2-bis(3-methyl-4-hydroxyphenyl)propane, 2,2-bis(3-chloro-4-hydroxyphenyl)propane, 2,2-bis(3-bromo-4-hydroxyphenyl)propane, 1,1,1,3,3,3-hexafluoro-2,2-bis(4-hydroxyphenyl)propane, 4,4'-biphenol,3,3',5,5'-tetramethyl-4,4'-dihydroxybiphenyl and 4,4 ' dihydroxybenzophenone; aliphatic diols such as ethyleneglycol, trimethyleneglycol, propyleneglycol, tetramethyleneglycol, 1,4-butanediol, pentamethyleneglycol, neopentylglycol, hexamethyleneglycol, dodecamethyleneglycol, diethyleneglycol, triethyleneglycol, tetraethyleneglycol, polyethyleneglycol and hydrobisphenol A; and alicyclic diols such as cyclohexanedimethanol; these may be used alone or in mixtures of two or more. Polyester resins obtained therefrom may also be used alone or in mixtures of two or more.

The polyester resin (A) used for the invention may be composed of these residues or combinations thereof, but preferred among them from the standpoint of workability and thermal stability are aromatic polyester resins composed of aromatic dicarboxylic acid residues and diol residues.

The polyester resin (A) used for the invention may also contain a constituent unit derived from a polyfunctional compound such as trimesic acid, pyromellitic acid, trimethylolethane, trimethylolpropane, trimethylolmethane and pentaerythritol in a small amount, for example in an amount no greater than 2 mole percent.

From the standpoint of heat resistance and workability, the most preferred combination among combinations of these dicarboxylic acid compounds and diol compounds are compounds comprising dicarboxylic acid compounds with 50–95 mole percent terephthalic acid and 50–5 mole percent isophthalic acid and/or orthophthalic acid, and diol compounds of glycols with 2–5 carbon atoms.

As preferred examples of the polyester resin (A) used for the invention there may be mentioned polyethylene terephthalate, polybutylene terephthalate, polyhexamethylene terephthalate, polycyclohexylenedimethylene terephthalate, polyethylene-2,6-naphthalate and polybutylene-2,6-naphthalate, among which the most preferred are polyethylene terephthalate, polybutylene terephthalate, polyethylene-2,6-naphthalate and polybutylene-2,6-naphthalate because of their suitable mechanical properties, gas barrier properties and metal adhesion.

The polyester resin (A) used for the invention preferably has a glass transition temperature (Tg, measured by a differential scanning calorimeter (DSC) with an approximately 10 mg sample and a temperature elevating rate of 10° C./min) of 50–120° C., and more preferably 60–100° C. The polyester resin (A) may be amorphous or crystalline, and when crystalline the crystal melting temperature (Tm) is usually 210–265° C. and preferably 210–245° C., while the low crystallization temperature (TC) is usually 110–220° C. and preferably 120–215° C. If the Tm is below 210° C. or the Tc is below 110° C., the heat resistance may be insufficient and the film shape may not be retainable during draw working. If the Tm is above 265° C. or the Tc is above 220° C., the resin may not adequately fill in the surface irregularities of the metal sheet, leading to poor adhesion.

The elastomer resin (B) used for the invention may generally be any publicly known elastomer resin. Preferred are elastomer resins wherein the glass transition temperature (Tg, measured by a differential scanning calorimeter (DSC) with an approximately 10 mg sample and a temperature elevating rate of 10° C./min) of the elastomeric portion is no higher than 50° C., the Young's modulus at room temperature is no greater than 1000 MPa and the elongation at break is at least 50%. If the Tg of the elastomeric portion is above 50° C., the Young's modulus at room temperature is above 1000 MPa or the elongation at break is less than 50%, it may not be possible to exhibit sufficient impact strength. In order to ensure impact strength at low temperatures, it is preferred for the Tg to be no higher than 10° C., and more preferably no higher than −30° C. To ensure more reliable impact strength, the Young's modulus at room temperature is preferably no greater than 100 MPa and more preferably no greater than 10 MPa, and the elongation at break is preferably at least 100%, and more preferably at least 300%.

As specific examples of the elastomer resin (B) used for the invention there may be mentioned polyolefin resins; diene elastomers such as styrene-butadiene copolymer (SBR), acrylonitrile-butadiene copolymer (NBR), polyisoprene (IPR) and polybutadiene (BR); styrene-based elastomers such as styrene-butadiene-styrene copolymer (SBS) and its hydrogenated form (SEBS), rubber-modified styrene (HIPS) and acrylonitrile-styrene-butadiene copolymer (ABS); silicon elastomers composed mainly of dimethylsiloxane; polyester elastomers such as aromatic polyester-aliphatic polyester copolymers or aromatic polyester-polyether copolymers; nylon elastomers, and the like.

Among these, polyolefin resins are preferred because of their low water vapor permeability. Polyolefin resins are resins with a repeating unit represented by the following general formula (a):

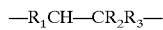

$$—R_1CH—CR_2R_3—\quad\quad\quad (a)$$

where $R_1$ and $R_3$ each independently represent an alkyl group of 1–12 carbon atoms or hydrogen, and $R_2$ represents an alkyl group of 1–12 carbon atoms, a phenyl group or hydrogen.

The polyolefin resin used for the invention may be a simple polymer of one such structural unit, or a copolymer of two or more different types, and it may also be a copolymer of resin units formed of such units.

As examples of such repeating units there may be mentioned aliphatic olefins of repeating units that appear with addition polymerization of o-olefins such as propylene, 1-butene, 1-pentene, 4-methyl-1-pentene, 1-hexene, 1-octene, 1-decene and 1-dodecene, or repeating units from addition of isobutene, and aromatic olefins of addition polymer units such as styrene monomers, as well as alkylated styrenes such as o-, m-, p-methylstyrene, o-, m-, p-ethylstyrene or t-butylstyrene, halogenated styrenes such as monochlorstyrene, and styrene-based monomers such as α-methylstyrene.

As examples of polyolefin resins there may be mentioned polyethylene, polypropylene, polybutene, polypentene, polyhexene and polyoctenylene, as simple α-olefin polymers. Copolymers of the aforementioned copolymers include aliphatic polyolefins such as ethylene-propylene copolymer, ethylene-butene copolymer, ethylene-propylene-1,6-hexadiene copolymer or ethylene-propylene-5-ethylidene-2-norbornene copolymer, and aromatic polyolefins such as styrene-based polymers; however, there is no limitation to these, and it is sufficient to satisfy the description of the repeating units given above. These resins may be used alone or in mixtures of two or more.

The polyolefin resin may have one of the aforementioned olefin units as its main component, and it may be copolymerized with a vinyl monomer, polar vinyl monomer or diene monomer copolymerized as a monomer unit or resin unit substituting the aforementioned units. A copolymerizing component may be used at no more than 50 mole percent, and preferably no more than 30 mole percent, with respect to the aforementioned units. At greater than 50 mole percent, the properties of the polyolefin resin, such as dimensional stability, may be reduced.

As examples of polar vinyl monomers there may be mentioned acrylic acid derivatives such as acrylic acid, methyl acrylate and ethyl acrylate, methacrylic acid derivatives such as methacrylic acid, methyl methacrylate and ethyl methacrylate, acrylonitrile, maleic anhydride, imide derivatives of maleic anhydride, vinyl chloride, and the like.

As diene monomers there may be mentioned butadiene, isoprene, 5-methylidene-2-norbornane, 5-ethylidene-2-norbornane, dicyclopentadiene and 1,4-hexadiene.

The most preferred resins as polyolefin resins for imparting impact strength are copolymers of ethylene and α-olefins of 3 or more carbon atoms, such as ethylene-propylene copolymer, ethylene-butene-1 copolymer, ethylene-pentene-1 copolymer, ethylene-3-ethylpentene copolymer and ethylene-octacene-1 copolymer; or terpolymers comprising ethylene, an α-olefin of 3 or more carbon atoms and a non-conjugated diene, obtained by copolymerizing butadiene, isoprene, 5-methylidene-2-norbornane, 5-ethylidene-2-norbornane, dicyclopentadiene or 1,4-hexadiene with the aforementioned binary polymers. For their ease of handling, it is preferred to use binary copolymers such as ethylene-propylene copolymer and ethylene-butene-1 copolymer, or resins obtained by copolymerizing 5-methylidene-2-norbornane, 5-ethylidene-2-norbornane, dicyclopentadiene or 1,4-hexadiene as non-conjugated dienes with ethylene-propylene copolymer or ethylene-butene-1 copolymer, with the α-olefin at 20–60 mole percent and the non-conjugated diene at 0.5–10 mole percent.

The vinyl polymer (C) containing at least 1 wt % of a unit with a polar group, to be used for the invention, is a vinyl polymer containing at least 1 wt % of a unit with a group where an element is bonded to an element with a Pauling electronegativity difference of 0.9 (eV)$^{0.9}$ or greater. If the unit with the polar group is present at less than 1 wt %, it will not be possible to express sufficient adhesion with metal sheets even though the elastomer resin (B) is capsulated by the vinyl polymer (C).

As specific examples of groups with bonded elements having a Pauling electronegativity difference of 0.9 (eV)$^{0.5}$ or greater there may be mentioned —C—O—, —C=O, —COO—, epoxy, $C_2O_2$, $C_2O_2N$—, —CN, —NH$_2$, —NH—, —X (X=halogen) and —SO$_3$—.

As examples of units with polar groups there may be mentioned vinyl alcohol as an example with a —C—O— group; vinylchloromethyl ketone as an example with a —C=O group; vinyl acids such as acrylic acid, methacrylic acid, vinyl acetate and propionic acid, and their metal salts or ester derivatives, as examples with a —COO— group; glycidyl esters of α,β-unsaturated acids, such as glycidyl acrylate, glycidyl methacrylate, glycidyl ethamethacrylate and glycidyl itacrylate as examples with an epoxy group; maleic anhydride as an example with a $C_2O_3$ group; imide derivatives of maleic anhydride as examples with a $C_2O_2N$— group; acrylonitrile as an example with a —CN group; acrylamine as an example with an —NH$_2$ group; acrylamide as an example with an —NH— group; vinyl chloride as an example with an —X group and styrene-sulfonic acid as an example with an —SO$_3$— group; any one or more of these may be included in the vinyl polymer (C). The unit with the polar group contained in the vinyl polymer (C) is not limited to those mentioned above, as it is sufficient to be a unit with a group to which is bonded an element with a Pauling electronegativity difference of 0.9 (eV)$^{0.5}$ or greater.

As examples of the vinyl polymer (C) used for the invention there may be mentioned simple polymers or those of two or more different types of the polar group-containing units mentioned above, as well as copolymers of the aforementioned polymer group-containing units with the nonpolar vinyl monomer represented by the following general formula (b):

$$R_1CH{=}CR_2R_3 \qquad (b)$$

where $R_1$ and $R_3$ each independently represent an alkyl group of 1–12 carbon atoms or hydrogen, and $R_2$ represents an alkyl group of 1–12 carbon atoms, a phenyl group, or hydrogen.

As examples of the nonpolar vinyl monomer of general formula (b) there may be mentioned aliphatic vinyl monomers including α-olefins such as ethylene, propylene, 1-butene, 1-pentene, 4-methyl-1-pentene, 1-hexene, 1-octene, 1-decene and 1-dodecene; isobutene, isobutylene, etc.; and aromatic vinyl monomers including styrene monomers, as well as alkylated styrenes such as o-, m-, p-methylstyrene, o-, m-, p-ethylstyrene or t-butylstyrene, addition polymer units of styrene-based monomers such as α-methylstyrene, etc.

As examples of simple polymers of polar group-containing units there may be mentioned polyvinyl alcohol, polymethyl methacrylate and polyvinyl acetate. As examples of copolymers of polymer group-containing units and nonpolar vinyl monomers there may be mentioned ethylene-methacrylic acid copolymer, ethylene-acrylic acid copolymer, ethylene-vinyl acetate copolymer and ionomer resins wherein the some or all of the carboxylic acid in one of these copolymers is neutralized with a metal ion, ethylene-methyl acrylate copolymer, ethylene-ethyl acrylate copolymer, ethylene-methyl methacrylate copolymer, ethylene-ethyl methacrylate copolymer, ethylene-glycidyl methacrylate copolymer, ethylene-maleic anhydride copolymer, butene-ethylene-glycidyl methacrylate copolymer, styrene-methyl methacrylate copolymer, styrene-acrylonitrile copolymer, and styrene-maleic anhydride copolymer. From the standpoint of ensuring barrier properties, the preferred combination is a copolymer of an α-olefin and a unit with a polar group. The vinyl polymer (C) used for the invention may be a vinyl polymer containing at least 1 wt % of the unit with a polar group, but there is no limitation to those mentioned above. The molecular weight of the vinyl polymer (C) is not particularly restricted, but it is preferably a number average molecular weight of from 2000 to 500,000. At less than 2000 or greater than 500,000 it may not be possible to sufficiently capsulate the elastomer resin (B).

For fine dispersion of the elastomer resin (B) capsulated by the vinyl polymer (C) in the polyester resin (A), it is important to achieve a proper balance for the interfacial tension between the vinyl polymer (C) and the polyester resin (A) and elastomer resin (B). It is preferred to control the content of the polar group-containing unit so that the Spread Parameter ($\lambda_{(Resin\ C)/(Resin\ B)}$) of the vinyl polymer (C) with respect to the elastomer resin (B) is positive. If $\lambda_{(Resin\ C)/(Resin\ B)}$ is positive, it is possible to ensure thermodynamic stability even with the elastomer resin (B) capsulated by the vinyl polymer (C). The Spread Parameter between two different polymers is the parameter defined by S. Y. Hobbs; Polym., Vol.29, p.1598 (1989) and is given by the following formula (ii):

$$\lambda_{(Resin\ C)/(Resin\ B)} = \gamma_{(Resin\ B)/(Resin\ A)} - \gamma_{(Resin\ C)/(Resin\ B)} - \gamma_{(Resin\ C)/(Resin\ A)} \quad (ii)$$

[where Resin A represents the polyester resin (A), Resin B represents the elastomer resin (B) and Resin C represents the vinyl polymer (C), and $\gamma_{i/j}$ is the interfacial tension between resin i and resin j, which is approximately proportional to 0.5 th power of the parameter $X_{i/j}$ indicating the compatibility between resin i and resin j (a smaller value indicating better compatibility).]

Since the compatibility between the polyester resin (A) and the elastomer resin (B) is low and $\gamma_{(Resin\ B)/(Resin\ A)} > 0$, the value of $\lambda_{(Resin\ C)/(Resin\ B)}$ can be positive if the mixing ratio of the nonpolar vinyl monomer (Monomer V) and the polar group-containing unit (Monomer U) in the vinyl polymer (C) is adjusted so that $X_{B/C}$, which indicates the compatibility between the elastomer resin (B) and the vinyl polymer (C), and $X_{A/C}$, which indicates the compatibility between the polyester resin (A) and the vinyl polymer (C), as defined by the following formulas (iii) and (iv), both approach 0:

$$X_{A/C} = \phi X_{(Resin\ A)/(Monomer\ V)} + (1-\phi) X_{(Resin\ A)/(Monomer\ U)} - \phi(1-\phi) X_{(Monomer\ V)/(Monomer\ U)} \quad (iii)$$

$$X_{B/C} = \phi X_{(Resin\ B)/(Monomer\ V)} + (1-\phi) X_{(Resin\ B)/(Monomer\ U)} - \phi(1-\phi) X_{(Monomer\ V)/(Monomer\ U)} \quad (iv)$$

where φ represents the mixing ratio (volume ratio) of the nonpolar vinyl monomer.

Consequently, the preferred vinyl polymer (C) is determined considering the compatibility that will depend on the type of polyester resin (A) and the elastomer resin (B). As specific examples of preferred combinations, when the polyester resin (A) is an aromatic polyester resin composed of an aromatic dicarboxylic acid residue and a diol residue and the elastomer resin (B) is a polyolefin resin, the vinyl polymer (C) is preferably a copolymer of ethylene and a unit with a polar group or SEBS having maleic anhydride or glycidyl methacrylate introduced to at least 1 wt %; a copolymer of ethylene and a unit with a polar group will allow $\lambda_{(Resin\ C)/(Resin\ B)}$ to be easily controlled to a positive value by appropriately controlling the mixing ratio of the ethylene and the unit with the polar group. More preferably, introduction of a functional group that has chemical action such as covalent bonding, coordination bonding, hydrogen bonding or ion bonding with the polyester resin (A) into a copolymer of ethylene and a unit with a polar group can provide thermodynamic stability at the interface between the polyester resin (A) and the vinyl polymer (C) upon capsulation.

Specific copolymers of ethylene with units having polar groups include ethylene-vinyl acid copolymer, ethylene-vinyl acid ester copolymer and their ionomer resins, copolymers of ethylene and α,β-unsaturated acid glycidyl esters, terpolymers of ethylene, vinyl acid or vinyl acid esters and α,β-unsaturated acid glycidyl esters, and the like. Of these, ionomer resins, copolymers of ethylene and α,β-unsaturated acid glycidyl esters and terpolymers of ethylene, vinyl acid or vinyl acid esters and α,β-unsaturated acid glycidyl esters are preferred. These resins exhibit relatively strong chemical interaction with the polyester resin (A) and form stable capsulated structures with the elastomer resin (B). Most preferred among these from the standpoint of moldability are ionomer resins, because the strength of their chemical action with the polyester resin (A) varies depending on the temperature.

The ionomer resins used may be any publicly known ionomer resins. Specific ones are copolymers of vinyl monomers and α,β-unsaturated carboxylic acids, wherein some or all of the carboxylic acid in the copolymer is neutralized with a metal cation.

Examples of vinyl monomers include the aforementioned α-olefin and styrene-based monomers, and as examples of α,β-unsaturated carboxylic acids there may be mentioned α,β-unsaturated carboxylic acids of 3–8 carbon atoms, and specifically acrylic acid, methacrylic acid, maleic acid, itaconic acid, maleic acid monomethyl ester, maleic anhydride and maleic acid monoethyl ester.

As examples of neutralizing metal cations there may be mentioned monovalent or divalent metal cations such as $Na^+$, $K^+$, $Li^+$, $Zn^{2+}$, $Mg^{2+}$, $Ca^{2+}$, $Co^{2+}$, $Ni^{2+}$, $Pb^{2+}$, $Cu^{2+}$ and $Mn^{2+}$. The remaining carboxyl groups that are not neutralized with the metal cation may be esterified with a lower alcohol.

As specific examples of ionomer resins there may be mentioned resins that are copolymers of ethylene with unsaturated monocarboxylic acids such as acrylic acid and methacrylic acid and copolymers of ethylene with unsaturated dicarboxylic acids such as maleic acid and itaconic acid, wherein some or all of the carboxyl groups in the copolymer are neutralized with a metal ion such as sodium, potassium, lithium, zinc, magnesium or calcium. Most preferred among these, for the purpose of improving compatibility between the polyester resin (A) and the elastomer resin (B), are resins that are copolymers of ethylene with acrylic acid or methacrylic acid (with 2–15 mole percent of structural units with carboxyl groups), wherein 30–70% of the carboxyl groups of the polymer are neutralized with a metal cation such as Na or Zn.

A dispersed structure for the resin composition of the invention can be formed relatively easily if the elastomer resin (B) and vinyl polymer (C) used for the invention form a core-shell type elastomer, with the elastomer resin (B) as the core and the vinyl polymer (C) as the shell. A core-shell type elastomer has a two-layer structure composed of a core and shell, where the core is in a soft rubber state and the shell on its surface is in a hard resin state.

As examples of core-shell type elastomers there may lo be mentioned elastomers wherein the core is composed of an acrylic-based elastomer, diene-based elastomer or silicon-based elastomer, and an acrylic-based polymer composed mainly of an acrylate or methacrylate is grafted thereon to form the shell. Grafting refers to graft copolymerization between the core resin and the shell resin.

Specifically, the elastomer composing the core is an acrylate-based polymer composed of a unit obtained from a monomer with the structure of general formula (c), or a diene-based polymer or an elastomer composed mainly of dimethylsiloxane.

$$CH_2=CR_1—CO—O—R_2 \quad (c)$$

Specific examples of structural units for the aforementioned acrylate-based polymer include alkyl acrylates, alkyl methacrylates and alkyl ethacrylates, among which are preferred those wherein $R_1$ is hydrogen or an alkyl group of 1–12 carbon atoms and $R_2$ is an alkyl group of 1–12 carbon atoms. More specifically, there may be mentioned methyl acrylate, ethyl acrylate, butyl acrylate, 2-ethylhexyl acrylate, methyl methacrylate, ethyl methacrylate, butyl methacrylate and n-octyl methacrylate. Preferred among these from the standpoint of imparting impact strength are ethyl acrylate, butyl acrylate, 2-hexyl acrylate, methyl methacrylate and n-octyl methacrylate. The acrylate-based polymer forming the core may be any one of these polymers alone, or copolymers of two or more thereof.

The acrylate-based polymer composing the core may also be copolymerized with another vinyl monomer, so long as the acrylate is the main component. "Main component" means at least 50 wt %. As specific examples of vinyl monomers there may be mentioned α-olefin monomers, styrene-based monomers and polar vinyl monomers. More specifically, as α-olefin monomers there may be mentioned ethylene, propylene, 1-butene, 1-pentene, 4-methyl-1-pentene, 1-hexene, 1-octene, 1-decene and 1-dodecene, as styrene-based monomers there may be mentioned styrene monomer as well as alkylated styrenes such as o-, m-, p-ethylstyrene and t-butylstyrene, halogenated styrenes such as monochlorstyrene, and α-methylstyrene, etc., and as polar vinyl monomers there may be mentioned acrylic acid, acrylonitrile, maleic anhydride and imide derivatives thereof, vinyl acetate, vinyl chloride and vinyl propionate.

An acrylate-based polymer composing the core is preferably partially crosslinked with a crosslinking agent in order to exhibit rubber elasticity. As examples of crosslinking agents there may be mentioned polyethylenic unsaturated vinyl monomers such as divinylbenzene, butylene diacrylate, ethylene dimethacrylate, butylene dimethacrylate, trimethylolpropane trimethacrylate, triallyl cyanurate and triallyl isocyanate. The amount of crosslinking agent added is no greater than 30 wt %, preferably no greater than 20 wt %, and more preferably no greater than 5 wt %. At greater than 30 wt % it may harden and no longer exhibit rubber elasticity.

A diene-based polymer composing the core is a polymer of a diene monomer or a hydrogenated polymer thereof, and specifically there may be mentioned polybutadiene and its hydrogenated polymers, or butadiene and styrene copolymer and its hydrogenated polymers.

The molecular weight of the polymer composing the core is not particularly restricted, but it is preferably a number average molecular weight of 2000 or greater. At less than 2000, rubber elasticity may not be adequately exhibited.

When the core is a crosslinked acrylate-based polymer, the molecular weight between crosslinked points is preferably at least 2000 from the standpoint of imparting sufficient rubber elasticity.

The glass transition temperature of the polymer composing the core (measured by a differential scanning calorimeter (DSC) with a temperature elevating rate of 10° C./min) is preferably no higher than 30° C., more preferably no higher than IOC, and more preferably no higher than –10° C. If the glass transition temperature is higher than 30° C., it will be difficult to exhibit rubber elasticity at room temperature or below.

The shell of the core-shell type elastomer will now be explained. It is important for the shell to be composed of an acrylate-based polymer, and the polarity of the acrylate-based polymer can be utilized to ensure adhesion when the core-shell type elastomer contacts with the metal sheet.

The acrylate-based polymer composing the shell is a polymer comprising a unit of general formula (c). Specifically, it is a polymer of the monomers mentioned above, and it may also be copolymerized with the aforementioned vinyl monomers so long as the acrylate unit is the main component. "Main component" means at least 50 wt %. When copolymerized with another Vinyl monomer, the composition ratio of the acrylate component is preferably at least 70 wt %. At less than 70 wt % the polarity of the acrylate unit cannot be sufficiently utilized, and the adhesion with the metal sheet will sometimes be inadequate.

Because the core-shell type elastomer has a core of a soft rubbery substance, the resin composing the shell must be hard from the viewpoint of handling. For this reason, the glass transition temperature of the acrylate-based polymer composing the shell (measured by a differential scanning calorimeter (DSC) with a temperature elevating rate of 10° C./min) is preferably at least 30° C., and more preferably at least 50° C.

Most preferred as the acrylate-based polymer unit composing the shell is methyl methacrylate, because it has a glass transition temperature in the aforementioned range and its polymerization rate is easily controlled.

A functional group or bond group capable of reacting with the residual terminal functional group or ester bond of polyester resin (A) is also preferably introduced in the acrylate-based polymer composing the shell in order to ensure compatibility with the polyester resin (A). As specific examples of functional groups there may be mentioned epoxy, carboxyl, hydroxyl, acid anhydride or amino groups, and when the shell is grafted, a functional group may be introduced by adding a publicly known vinyl monomer with one of these functional groups. As examples of bond groups there may be mentioned ester bonds, carbonate bonds and amide bonds, and when the shell is grafted a bond group may be introduced using an initiator with one of these bonds, as disclosed in T. O. Ahn, et al.; J. Polym. Sci. Part A, Vol.31, 435(1993). Most preferred among these functional groups and bond groups, from the standpoint of reactivity, are epoxy groups and aromatic-aromatic ester bonds, and for polymerization of the shell, the epoxy group and ester bond may be introduced by adding glycidyl metharcrylate or a polyacrylate azo initiator as disclosed in T. O. Ahn, et al.; J. Polym. Sci. Part A, vol.31, 435(1993).

The amount of the unit with these functional groups or bond groups to be introduced is determined by their respective reactivities, and there are no particular restrictions so long as the acrylate unit is the main component. However, for functional groups the amount of the functional group-containing unit introduced is preferably no greater than 15 wt %, and more preferably no greater than 5 wt %. At greater than 15 wt % a comb-shaped polymer is produced during the kneading step, and compatibility with the polyester resin (A) is sometimes inadequately improved. For bond groups the amount of the bond group-containing unit introduced is preferably no greater than 15 wt %. At greater than 15 wt % the bond group-containing units form domains, and compatibility with the polyester resin (A) may not be improved.

The core-shell type elastomer preferably contains the rubber polymer core at 20 wt % or greater, preferably 50 wt % or greater, and more preferably 80 wt % or greater. At less than 20 wt %, sufficient impact strength may not be exhibited.

The resin composition of the invention may be produced by a publicly known blending method.

Specifically, it may be produced by melting and kneading the polyester resin (A), elastomer resin (B) and vinyl polymer (C) having an appropriate interfacial tension difference, at a prescribed temperature such as 200–350° C. in a publicly known type of blender, using the interfacial tension difference to form a capsule structure.

It may also be produced by grafting the elastomer resin (B) and the vinyl polymer (C) to form a core-shell type elastomer, and then blending with the polyester resin (A). The core-shell type elastomer may be polymerized by a publicly known radical polymerization process, of which the emulsion polymerization process described in U.S. Pat. No. 4,096,202 is preferred from the standpoint of controlling the particle size of the resulting polymer to the micro level. The following may be mentioned as a specific polymerization process, but there is no limitation to this process so long as the product is a core-shell type graft elastomer and the shell is an acrylate-based polymer.

As the first stage of the polymerization, the unit monomer for the core is used for radical polymerization. Here, the grafting agent used is a polyethylenic unsaturated monomer with multiple double bonds, added at about 0.1–5 wt %. The multiple double bonds of the grafting agent preferably have different reaction rates, and specific ones are allyl methacrylate and diallyl malate. As the second state of polymerization after polymerization of the core polymer, the monomer for the shell and an initiator are added for graft polymerization of the shell, to obtain a core-shell type elastomer.

AS specific examples of core-shell type elastomers there may be mentioned MBA resins wherein the core is polybutyl acrylate and the shell is polymethyl methacrylate, MBS resins wherein the core is butadiene-styrene copolymer and the shell is polymethyl methacrylate, and polymers wherein the core is polydimethylsiloxane and the shell is polymethyl methacrylate; the acrylate-based core-polymerized acrylate shell polymer disclosed in U.S. Pat. No. 4,096,202 may also be used for the invention.

The resin composition comprising the polyester resin (A) and the core-shell type elastomer used for the invention may also include a publicly known compatibilizer added for the purpose of improving compatibility between the polyester resin (A) and the core-shell type elastomer. The amount of the compatibilizer added is preferably no greater than 15 wt %, and more preferably no greater than 5 wt %. At greater than 15 wt % the compatibilizer may form an independent compatible structure, making it difficult to exhibit a sufficient compatibility-improving effect. As specific examples of compatibilizers there may be mentioned reactive compatibilizers and non-reactive compatibilizers, and as reactive compatibilizers there may be mentioned polymers that are compatible with core-shell type elastomers and have introduced therein functional groups or bonds that are reactive with the terminal residue functional group or bond of the polyester resin (A). More specifically, there may be mentioned random copolymerized polymers of glycidyl methacrylate and maleic anhydride with the polymer composing the shell of the core-shell type elastomer and block and graft copolymerized polymers of aromatic polyesters with the polymer composing the shell. As non-reactive compatibilizers there may be mentioned block and graft copolymers of the polyester resin (A) with the polymer composing the shell of the core-shell type elastomer.

Blending of the resin composition of the invention may be carried out by a publicly known resin blending method such as resin kneading, solvent blending or the like. As an example of a resin kneading method there may be mentioned a method of dry blending with a tumbler/blender, Henschel mixer or v-type blender, followed by melt kneading with a single-screw or twin-screw extruder, kneader, Banbury mixer or the like. As an example of a solvent blending method there may be mentioned a method of dissolving the polyester resin (A), elastomer resin (B) and vinyl polymer (C) in a common solvent for each resin, followed by evaporation of the solvent or addition of a common non-solvent and recovery of the blend.

The resin composition for coating a metal sheet of the invention may also contain in admixture such fiber reinforcers as glass fibers, metal fibers, potassium titanate whiskers and carbon fibers, or such filler reinforcers as talc, calcium carbonate, mica, glass flakes, milled fibers, metal flakes and metal powder, for the purpose of improving the rigidity or linear expansion properties. Preferred among such fillers are glass fibers and carbon fibers, with a fiber size of 6–60 $\mu$m and a fiber length of at least 30 $\mu$m. These are preferably added in an amount of 5–15 parts by weight with respect to the total weight of the resin composition.

Depending on the purpose, the resin composition may also contain appropriately added amounts of heat stabilizers, antioxidants, photostabilizers, release agents, lubricants, pigments, flame retardants, plasticizers, antistatic agents or antibacterial or antifungal agents.

The resin composition of the invention may be widely used as a coating material for metal sheets. The metal sheets are not particularly limited, and include steel sheets for cans such as tinned sheet iron, thin tin-plated steel sheets, electrolytic chromic acid treated steel sheets (tin-free steel) and nickel-plated steel sheets, as well as other surface treated steel sheets including hot-dip plated steel sheets such as hot-dip zinc-plated steel sheets, hot-dip zinc-iron alloy-plated steel sheets, hot-dip zinc-aluminum-magnesium alloy-plated steel sheets, hot-dip aluminum-silicon alloy-plated steel sheets and hot-dip lead-tin alloy-plated steel sheets; electroplated steel sheets such as zinc electroplated steel sheets, zinc-nickel electroplated steel sheets, zinc-iron electroplated steel sheets and zinc-chromium electroplated steel sheets; cold-rolled steel sheets and metal sheets of aluminum, copper, nickel, zinc, magnesium and the like. Such metal sheets may be coated on either or both sides. The coating film thickness for coating of the resin composition of the invention onto a metal sheet is not particularly limited, but is preferably 1–300 $\mu$m. At less than 1 $\mu$m the coating may have insufficient impact strength, and at greater than 300 $\mu$m there are disadvantages in terms of economy.

A publicly known method may be used for coating onto the metal sheet. Specifically, there may be mentioned (1) a method in which the resin composition that has been pelletized after melt kneading of a resin composition starting material is subjected to melt kneading or melt extrusion with a T-die or ring-mounted extruder to form a film and the resulting film is subjected to thermocompression bonding with the metal sheet; (2) a method in which the step of melt kneading of the resin composition starting material and pelletizing in (1) above is omitted, and the resin composition starting material is instead directly introduced into a T-die mounted melt kneader to form a film and the resulting film is subjected to thermocompression bonding with the metal sheet (for methods (1) and (2), the film may be unstretched, or stretched either in one or two directions); and (3) a method in which the film exiting the T-die in (1) or (2) above is directly subjected to thermocompression bonding with the metal sheet without being wound up on a roll.

Because the resin composition of the invention contains the elastomer resin (B), it can exhibit sufficient impact strength even without graded crystallization in the film after coating. Consequently, the metal sheet may also be coated by (4) a method in which the resin composition is melted and coated with a bar coater or roll, (5) a method in which the metal sheet is dipped into the molten resin composition, or (6) a method in which the resin composition is dissolved in a solvent and spray coated, with no particular restrictions on the coating method.

The most preferred methods of coating onto the metal sheet from the standpoint of working efficiency are the aforementioned methods (1) to (3). When coating is accomplished by method (3), the film thickness is preferably 1–300 um for the same reasons given above. The surface roughness of the film is also preferably no greater than 500 nm in terms of $R_{max}$, with measurement of an arbitrary 1 mm length of the film surface roughness. At greater than 500 nm, air bubbles may be entrained during coating by heat-press bonding.

The resin film for coating a metal sheet of the invention is a resin film comprising a resin composition of the invention, and even the resin film prior to coating may be a resin film formed after coating by one of the aforementioned methods (4) to (6). A publicly known lubricant such as disclosed in Japanese Unexamined Patent Publication HEI No. 5-186613 may also be added for the purpose of improving the lubrication during the metal sheet coating step or the metal sheet working step. The particle size of the lubricant is preferably no greater than 2.5 $\mu$m. At greater than 2.5 $\mu$m, the mechanical properties of the resin film may be reduced. The amount of lubricant added is determined based on the windability and deep draw workability of the metal sheet, and for example, it is preferably no greater than 0.05 wt % for monodisperse silica with a mean particle size of 2.0 $\mu$m and no greater than 0.3 wt % for titanium dioxide with a mean particle size of 0.3 $\mu$m.

For coating of the resin film of the invention onto the metal sheet, either or both sides of the metal sheet are coated using at least the aforementioned resin film for lamination of either a single layer or multiple layers. Here, one or more resin films may be used for lamination as a single layer or multiple layers on one or both sides of the metal sheet, or if necessary, another publicly known resin film, for example, a polyester film such as a PET film or polycarbonate film, a polyolefin film such as a polyethylene film, a polyamide film such as a 6-nylon film, or an ionomer film or the like, or a publicly known resin composition film, for example a crystalline or amorphous polyester composition film, a polyester/ionomer composition film or a polyester/polycarbonate composition film, may be coated as lamination of a lower layer and/or upper layer. A specific lamination method, when using the aforementioned methods (1) to (3), is a method in which a multilayer T-die is used to produce a multilayer film of a resin film of the invention with another resin film or resin composition film, and the multilayer is subjected to thermocompression bonding. When using the aforementioned methods (4) to (6), the resin composition of the invention may be coated after coating of another resin composition, or conversely, the other resin composition may be coated after coating of the resin composition of the invention, to laminate multiple layers.

The resin-coated metal sheet of the invention is a metal sheet coated with a resin film, and the coating may be on one side or both sides. The thickness of the metal sheet is not particularly restricted, but is preferably 0.01–5 mm. At less than 0.01 mm it is difficult to achieve strength, and at greater than 5 mm the working becomes more difficult.

The resin-coated metal sheet of the invention is one coated with a resin film of the invention, but if necessary a publicly known resin film may also be coated on the metal sheet by lamination as a lower layer and/or upper layer for the resin film of the invention. A publicly known adhesive may also be laminated between the metal sheet and the resin film of the invention. As examples of adhesives there may be mentioned the polyester resin-based aqueous dispersion disclosed in Japanese Examined Patent Publication SHO No. 60-12233, the epoxy-based adhesive disclosed in Japanese Examined Patent Publication SHO No. 63-13829 and the polymers with different functional groups disclosed in Japanese Unexamined Patent Publication SHO No. 61-149341.

A resin-coated metal container according to the invention may be formed by a publicly known working method as a resin-coated metal container comprising a resin-coated metal sheet of the invention. As specific methods there may be mentioned draw ironing molding, draw-redraw molding, stretch draw molding and the like, but the molding method is not limited to these molding methods and may be any one that gives a resin-coated metal container using a resin-coated metal sheet of the invention.

The resin composition of the invention is a resin composition comprising of three components, the polyester resin (A), the elastomer resin (B) and the vinvl polymer (C) containing at least 1 wt % of a unit with a polar group, and it has a structure wherein the elastomer resin (B) capsulated by the vinyl polymer (C) is finely dispersed in the polyester resin (A). It is thus possible to improve the impact strength of the polyester resin (A) with the elastomer resin (B), and since the elastomer resin (B) is capsulated by the vinyl polymer (C), it is possible to improve the compatibility between the polyester resin (A) and the elastomer resin (B) and to prevent direct contact between the metal sheet and elastomer resin (B) to thus ensure adhesion between the metal sheet and the resin composition. As a result, the metal sheet coating resin composition of the invention can be suitably used as a metal-sheet-coating material exhibiting excellent moldability, heat resistance, impact strength, chemical resistance, mechanical strength, gas barrier properties and adhesion with metals. A metal sheet coating resin film of the invention is a film composed mainly of a resin composition of the invention, and can therefore be suitably used as a metal sheet coating resin film having the properties described above.

A resin-coated metal sheet according to the invention is the aforementioned resin composition or resin film coating one or both sides of a metal sheet, and it therefore exhibits excellent adhesion between the resin and the metal sheet as well as corrosion resistance, impact strength and workability, while its excellent painting and printing properties renders it adaptable to designing; it thus has a wide range of uses, including uses for metal containers such as metal cans, cases for household electrical appliances, members of metal furniture, automobile parts such as automobile outer panels, and interior and exterior materials for construction such as interior walls and doors. In particular, the excellent working follow-up properties for draw molding and draw wipe molding allow formation of metal containers with an excellent outer appearance.

Furthermore, since a resin coated metal container of the invention is a metal container prepared by shaping a resin-coated metal sheet of the invention, it has impact strength that can withstand impact during the cutting step, canning step, transport, etc., and heat resistance that can withstand drying, printing, baking, etc. after canning, as well as flavor properties (flavor preservation) and a long shelf life. It can therefore be suitably used as a container for refreshment drinks and foods.

EXAMPLES

The present invention will now be explained in further detail by way of the following examples and comparative examples.

In the following examples and comparative examples, polyethylene terephthalate (PET) [RN163, Toyobo, KK] and polybutylene terephthalate (PBT) [1401-X04, Toray, KK] were used as the polyester resin (A), ethylene-propylene rubber (EPR) [EPO7P, JSR, KK.] and ethylene-butene rubber (EBM) [EBM2041P, JSR, KK.] were used as the elastomer resin (B), ethylene-based ionomers [Himilan 1706, 1707, Mitsui DuPont, KY.] and ethylene-methacrylic acid copolymer [Newcrel N1035, Mitsui DuPont, KK.] were used as the vinyl polymer with at least 1 wt % of a unit with a polar group, and polybutyl acrylate-polymethyl methacrylate copolymer (MBA) [Paraloid EXL2314, Kureha Chemicals, KK.] was used as the core-shell type elastomer.

Examples 1–11

A V-type blender was used for dry blending of the resin mixture proportions shown in Table 1, and melt kneading was carried out at 260° C. in a twin-screw extruder to obtain resin composition pellets. After cutting out an ultrathin strip from the resin composition using a microtome, it was dyed with a ruthenium acid and the dispersion state of the elastomer resin (B) and vinyl polymer (C) in the polyester resin (A) was analyzed with a transmission electron microscope. As a result, in all cases, the elastomer resin (B) was almost 100% capsulated by the vinyl polymer (C), and the sphere equivalent diameter of the elastomer resin (B) was under 1 μm as shown in Table 1, allowing fine dispersion in the polyester resin (A).

TABLE 1

| | Resin composition | | | | | | Sphere equivalent diameter (μm) |
|---|---|---|---|---|---|---|---|
| | Polyester resin | | Elastomer resin | | Vinyl polymer | | |
| | Type | wt % | Type | wt % | Type | wt % | |
| Example 1 | PET | 87 | EBM | 10 | 1706 | 3 | 0.5 |
| Example 2 | PET | 80 | EBM | 15 | 1706 | 5 | 0.5 |
| Example 3 | PET | 80 | EBM | 10 | 1706 | 10 | 0.5 |
| Example 4 | PET | 80 | EBM | 10 | 1707 | 10 | 0.5 |
| Example 5 | PET | 80 | EBM | 10 | N1035 | 10 | 0.5 |
| Example 6 | PET | 90 | EPR | 5 | 1706 | 5 | 0.8 |
| Example 7 | PET | 80 | EPR | 10 | 1706 | 10 | 0.8 |
| Example 8 | PET | 70 | EPR | 15 | 1706 | 15 | 0.8 |
| Example 9 | PET | 90 | EPR | 5 | 1707 | 5 | 0.8 |
| Example 10 | PET | 80 | EPR | 10 | 1707 | 10 | 0.8 |
| Example 11 | PET | 70 | EPR | 15 | 1707 | 15 | 0.8 |

The pellets were used to obtain a 30-μm thick film with an extrusion T-die (extrusion temperature: 280° C.).

The film was laminated over both sides of 2.5-mm thick tin-free steel heated to 250° C., and then quenched by water cooling to below 100° C. within 10 seconds.

The resin-coated metal sheet thus obtained was immersed for 24 hours at room temperature in an aqueous solution (UCC solution) containing 1.5 wt % citric acid and 1.5 wt % salt or sodium chloride, and then evaluated by the peeled length (mm) of the film (average of 10 samples). The evaluation scale was ⊚: 0.0 mm, ○: 0.0–0.5 mm, Δ: 0.5–2.0 mm and X: over 2.0 mm. The results of adhesion testing are shown in Table 2.

The impact strength evaluation of the resin-coated metal sheets was carried out by the DuPont falling impact test. After dropping a 0.5 kg steel ball on the metal sheet from a height of 30 cm, the steel sheet was placed as a base with the protruding side (r=8 mm) of the sample on the top and a wall was formed with a soft rubber resin around the protruding area, 1.0% saline was poured therein, the sample was used as the anode while the platinum set near the protruding area was used as the cathode, and the ERV value (mA) was measured upon application of a voltage of +6 V. The ERV value was evaluated according to the scale given below. After then placing the resin-coated metal sheet in a 0° C. constant temperature tank for 24 hours, the same impact strength evaluation was conducted to evaluate the low temperature impact strength. The evaluation was made based on the following scale: ⊚: all samples less than 0.01 mA, ○: 1–3 samples 0.01 mA or greater, Δ: 3–6 samples 0.01 mA or greater and X: 7 or more samples 0.01 mA or greater. The results are shown in Table 2.

TABLE 2

| | Adhesion | Normal temperature impact strength | Low temperature impact strength |
|---|---|---|---|
| Example 1 | ⊚ | ⊚ | ⊚ |
| Example 2 | ⊚ | ⊚ | ⊚ |
| Example 3 | ⊚ | ⊚ | ⊚ |
| Example 4 | ⊚ | ⊚ | ⊚ |
| Example 5 | ⊚ | ⊚ | ⊚ |
| Example 6 | ⊚ | ○ | ○ |
| Example 7 | ⊚ | ⊚ | ⊚ |
| Example 8 | ⊚ | ⊚ | ⊚ |
| Example 9 | ⊚ | ○ | ○ |
| Example 10 | ⊚ | ⊚ | ⊚ |
| Example 11 | ⊚ | ⊚ | ⊚ |

Examples 12 and 13

A V-type blender was used for dry blending of the resin mixture proportions shown in Table 3, and melt kneading was carried out at 230° C. in a twin-screw extruder to obtain resin composition pellets. AS a result of analysis of the dispersion state in the same manner as for Examples 1–11, it was confirmed that the elastomer resin (B) was 100% capsulated by the vinyl polymer (C), and that the sphere equivalent diameters of the elastomer resins (B) were under 1 μm as shown in Table 3, allowing fine dispersion in the polyester resin (A).

TABLE 3

| | Resin composition | | | | | Sphere equivalent diameter (μm) |
|---|---|---|---|---|---|---|
| | Polyester resin | | Elastomer resin | | Vinyl polymer | |
| | Type | wt % | Type | wt % | Type | wt % | |
| Example 12 | PBT | 80 | EPR | 10 | 1706 | 10 | 0.6 |
| Example 13 | PBT | 80 | EBM | 10 | 1706 | 10 | 0.5 |

Films were fabricated in the same manner as for Examples 1–11 and were stretched over both sides of 2.5-mm thick tin-free steel, and the adhesion and impact strength were evaluated. The results are shown in Table 4.

TABLE 4

| | Adhesion | Normal temperature impact strength | Low temperature impact strength |
|---|---|---|---|
| Example 12 | ◎ | ◎ | ◎ |
| Example 13 | ◎ | ◎ | ◎ |

Examples 14–16

A V-type blender was used for dry blending of the resin mixture proportions shown in Table 5, and melt kneading was carried out at 240° C. in a twin-screw extruder to obtain resin composition pellets. As a result of analysis of the dispersion state in the same manner as for Examples 1–11, it was confirmed that core-shell type elastomers had sphere equivalent diameters of under 1 μm as shown in Table 5, allowing fine dispersion in the polyester resin (A).

TABLE 5

| | Resin composition | | | | Sphere equivalent diameter (μm) |
|---|---|---|---|---|---|
| | Polyester resin | | Core-shell type elastomer | | |
| | Type | wt % | Type | wt % | |
| Example 14 | PET | 90 | MBA | 10 | 0.25 |
| Example 15 | PET | 80 | MBA | 20 | 0.25 |
| Example 16 | PET | 70 | MBA | 30 | 0.25 |

Films were fabricated in the same manner as for Examples 1–11 (but with an extrusion temperature of 240° C.) and were stretched over both sides of 2.5-mm thick tin-free steel, and the adhesion and impact strength were evaluated. The results are shown in Table 6.

TABLE 6

| | Adhesion | Normal temperature impact strength | Low temperature impact strength |
|---|---|---|---|
| Example 14 | ◎ | ◎ | ◎ |
| Example 15 | ◎ | ◎ | ◎ |
| Example 16 | ◎ | ◎ | ◎ |

Comparative Example 1

Based on the examples of Japanese Examined Patent Publication HEI No. 2-9935, a twin-screw extruded film comprising two layers, PBT and PET (PBT layer: 10 μm, PET layer: 20 μm, refractive index in direction of PET layer film thickness: 1.526) was laminated onto tin-free steel under the same conditions as Examples 1–11 (coated with the PBT layer adhered to the tin-free steel), and the adhesion and impact strength were evaluated in the same manner as in Examples 1–11.

Comparative Example 2

Based on the examples of Japanese Unexamined Patent Publication HEI No. 2-57339, a twin-screw extruded polyester film (a film composed of a terephthalic acid/isophthalic acid/ethylene glycol residue (78/22/100), specific gravity: 1.3387, thickness: 30 μm, surface orientation coefficient: 0.120) was laminated onto tin-free steel under the same conditions as Examples 1–11, and the adhesion and impact strength were evaluated in the same manner as in Examples 1–11.

Comparative Example 3

Based on Example 1 in Japanese Unexamined Patent Publication SHO No. 64-22530, a 108 μm unstretched PET film was heat treated after stretching at 95° C. to a factor of 2.7 in the lengthwise direction and at 105° C. to a factor of 2.6 in the widthwise direction, to obtain an approximately 20 μm stretched film. The film was laminated onto tin-free steel under the same conditions as Examples 1–11, and the adhesion and impact strength were evaluated in the same manner as in Examples 1–11.

Comparative Example 4

Based on Example 1 in Japanese Unexamined Patent Publication HEI No. 7-195617, PET and an ionomer (Himilan 1707) were melt kneaded at a weight ratio of 90/10 to obtain pellets. The pellets were used to fabricate a film in the same manner as Examples 1–11, and this was stretched over both sides of 2.5-mm thick tin-free steel and the adhesion and impact strength were evaluated.

Comparative Example 5

Based on Example 1 in Japanese Unexamined Patent Publication HEI No. 7-290643, PET, an ionomer (Himilan 1707) and a polyester elastomer (Haitoreru 4057, Toray-DuPont, KK.) were melt kneaded at a weight ratio of 80/10/10 to obtain pellets. The pellets were used to fabricate a film in the same manner as Examples 1–11, and this was stretched over both sides of 2.5-mm thick tin-free steel and the adhesion and impact strength were evaluated.

The results for Comparative Examples 1–5 are shown in Table 7.

TABLE 7

| | Adhesion | Normal temperature impact strength | Low temperature impact strength |
|---|---|---|---|
| Comp. Ex. 1 | ○ | ○ | Δ |
| Comp. Ex. 2 | ○ | x | x |
| Comp. Ex. 3 | Δ | Δ | Δ |
| Comp. Ex. 4 | ◎ | Δ | x |
| Comp. Ex. 5 | ◎ | ○ | Δ |

Examples 17–21, Comparative Examples 6–10

The resin-coated metal sheets obtained in Examples 1, 7, 14–16 and Comparative Examples 1–5 were cut into disks with a 150 mm diameter and subjected to deep draw working in 4 stages using a drawing die and punch, and from each there were fabricated 10 seamless side containers with a 55 mm diameter (hereunder referred to as "cans").

The cans were evaluated and tested, and the results of evaluation based on the following scales are shown in Table 8.

(1) Deep Draw Workability I (Evaluation of Film Surface Layer)

○: All 10 cans had satisfactorily worked films with no whitening or fracture in the films on the inside or outside of the cans.

Δ: 1–5 cans had whitening of the film at the can tops.

X: At least 6 cans had film fracture in part of the films.

(2) Deep Draw Workability II (Evaluation of Can Interior Film)

○: All 10 cans had satisfactorily worked inner and outer sides and gave a value of 0.1 mA or lower in a rust proof test on the can interior film side (current value (ERV value) (mA) upon application of a voltage of +6 V in 1.0% saline, using the can as the anode and platinum as the cathode).

X: At least 3 cans exceeded 0.1 mA in a rust proof test on he can interior film side.

(3) Impact Strength

Satisfactorily deep draw worked cans were filled with water, and after dropping 10 cans for each sample from a height of 10 cm onto a vinyl chloride tile floor, an ERV test was conducted in the cans.

○: All 10 cans 0.1 mA or lower.

Δ: 1–5 cans exceeded 0.1 mA.

X: At least 6 cans exceeded 0.1 mA.

(4) Heat Resistant Brittleness

Satisfactorily deep draw worked cans were heated at 200° C.×5 minutes, and then the impact strength was measured by the method described above to evaluate the heat resistant brittleness.

TABLE 8

|  | Deep draw workability I | Deep draw workability II | Impact strength | Heat resistant brittleness |
| --- | --- | --- | --- | --- |
| Example 17 | ○ | ○ | ○ | ○ |
| Example 18 | ○ | ○ | ○ | ○ |
| Example 19 | ○ | ○ | ○ | ○ |
| Example 20 | ○ | ○ | ○ | ○ |
| Example 21 | ○ | ○ | ○ | ○ |
| Comp. Ex. 6 | Δ | X | — | — |
| Comp. Ex. 7 | ○ | ○ | Δ | X |
| Comp. Ex. 8 | ○ | X | Δ | Δ |
| Comp. Ex. 9 | ○ | ○ | Δ | X |
| Comp. Ex. 10 | ○ | ○ | ○ | Δ |

According to these results, the resin compositions of the invention demonstrated more excellent adhesion with metal sheets and impact strength, and particularly impact strength at low temperature, compared to the comparative examples. Furthermore, the resin-coated metal sheets of the invention also demonstrated excellent film working follow-up properties, and the resin-coated metal containers of the invention demonstrated excellent impact strength and heat resistant brittleness.

Industrial Applicability

The resin composition of the invention maintains the heat resistance, workability, adhesion with metal sheets, gas barrier properties and flavor properties of the polyester resin (A), while the elastomer resin (B) further enhances the elongation and impact strength of the polyester resin (A) and the vinyl polymer (C) capsulates the elastomer resin (B) to improve the compatibility between the polyester resin (A) and the elastomer resin (B); in addition, direct contact between the metal sheet and the elastomer resin (B) is prevented to ensure adhesion between the metal sheet and the resin composition. This results in excellent properties including moldability, heat resistance, impact strength, chemical resistance, mechanical strength, gas barrier properties and adhesion with metals, which render it suitable for use as a coating material for metal sheets.

Moreover, metal-sheet-coating resin films, resin-coated metal sheets and resin-coated metal containers according to the invention, which employ the resin composition of the invention, can be suitably used for various metal sheet coating materials, various metal members such as containers, and metal containers with excellent storing and flavor properties.

Because the resin-coated metal sheets of the invention have their metal sheet surfaces precoated with the resin, it is possible to eliminate the painting steps for customers and thus provide an effect that can contribute to a simpler process and reduced costs for customers.

What is claimed is:

1. A resin film-laminated metal sheet comprising a resin layer laminated on a metal sheet, said resin laminated layer comprising a polyester resin (A) having an intrinsic viscosity of 0.5–2.0 dl/g, an elastomer resin (B) and a vinyl polymer (C) containing at least 1 wt % of a unit with a polar group, wherein said three components (A), (B) and (C) are melt-mixed to have a structure wherein the elastomer resin (B) is finely dispersed in the polyester resin (A) and at least a portion of the elastomer resin (B) is capsulated by the vinyl polymer (C), wherein the elastomer resin (B) is softer than the vinyl polymer (C).

2. A resin film-laminated metal sheet comprising a resin layer laminated on a metal sheet, said resin laminated layer comprising a polyester resin (A) having an intrinsic viscosity of 0.5–2.0 dl/g, an elastomer resin (B) and a vinyl polymer (C) containing at least 1 wt % of a unit with ethylene and a polar group, and having a structure wherein the elastomer resin (B) is finely dispersed in the polyester resin (A) and at least a portion of the elastomer resin (B) is capsulated by the vinyl polymer (C), wherein the elastomer resin (B) is softer than the vinyl polymer (C).

3. A resin film-laminated metal sheet comprising a resin layer laminated on a metal sheet, said resin laminated layer comprising a polyester resin (A) having an intrinsic viscosity of 0.5–2.0 dl/g, and a core/shell type elastomer resin comprising a core of an elastomer resin (B) and a shell of a vinyl polymer (C) comprising an acrylate-based polymer and an epoxy group or an aromatic polyester bond is introduced into the acrylate-based polymer at up to 15 wt % with respect to acrylate units, and having a structure wherein the core/shell type elastomer resin is finely dispersed in the polyester resin (A), wherein the elastomer resin (B) is softer than the vinyl polymer (C).

4. A resin film-laminated metal sheet comprising a resin layer laminated on a metal sheet, said resin laminated layer comprising a crystalline polyester resin (A) having an intrinsic viscosity of 0.5–2.0 dl/g, an elastomer resin (B) and a vinyl polymer (C) containing at least 1 wt % of a unit with a polar group, and having a structure wherein the elastomer resin (B) is finely dispersed in the polyester resin (A) and at least a portion of the elastomer resin (B) is capsulated by the vinyl polymer (C), wherein the elastomer resin (B) is softer than the vinyl polymer (C).

5. A resin film-laminated metal sheet comprising a resin layer laminated on a metal sheet according to any one of claims 1–4, wherein the sphere equivalent diameter of the elastomer resin (B) finely dispersed in the polyester resin (A) is no greater than 1 μm.

6. A resin film-laminated metal sheet comprising a resin layer laminated on a metal sheet according to any one of claims 1–4, wherein the resin layer comprises 1–50 parts by weight of the elastomer resin (B) and 1–50 parts by weight of the vinyl polymer (C) with respect to 100 parts by weight of the polyester resin (A).

7. A resin film-laminated metal sheet comprising a resin layer laminated on a metal sheet according to any one of claims 1–4, wherein the polyester resin (A) is composed of an acid component comprising 50–95 mole percent of terephthalic acid and 50–5 mole percent of isophthalic acid and/or orthophthalic acid, and a diol component comprising a glycol of 2–5 carbon atoms.

8. A resin film-laminated metal sheet comprising a resin layer laminated on a metal sheet according to any one of claims 1–4, wherein the elastomer resin (B) is a polyolefin resin.

9. A resin film-laminated metal sheet comprising a resin layer laminated on a metal sheet according to claim 8, wherein the polyolefin resin is a copolymer of ethylene and an α-olefin of 3 or more carbon atoms, or a terpolymer comprising ethylene, an α-olefin of 3 or more carbon atoms and a non-conjugated diene.

10. A resin film-laminated metal sheet comprising a resin layer laminated on a metal sheet according to any one of claims 1–4, wherein the vinyl polymer (C) is an ionomer resin.

11. A resin film-laminated metal sheet comprising a resin layer laminated on a metal sheet according to any one of claims 1, 2 or 4, wherein the elastomer resin (B) and vinyl polymer (C) form a core-shell type elastomer, with the elastomer resin (B) as the core and the vinyl polymer (C) as the shell.

12. A resin film-laminated metal sheet comprising a resin layer laminated on a metal sheet according to claim 11, wherein the vinyl polymer (C) is an acrylate-based polymer.

13. A resin film-laminated metal sheet comprising a resin layer laminated on a metal sheet according to claim 12, wherein units containing epoxy groups or aromatic polyester bonds are introduced into the acrylate-based polymer at no greater than 15 wt % with respect to the acrylate units.

14. A resin film-laminated metal sheet comprising a resin layer laminated on a metal sheet according to any one of claims 1–4, wherein said resin composition contains a pigment.

15. A resin film-laminated metal container made by a process comprising at least one of stretching, ironing and drawing of the resin film-laminated metal sheet according to any one of claims 1–4.

16. A resin film-laminated metal container made by a process comprising at least one of stretching, ironing and drawing of the resin film-laminated metal sheet according to claim 5.

17. A resin film-laminated metal container made by a process comprising at least one of stretching, ironing and drawing of the resin film-laminated metal sheet according to claim 6.

18. A resin film-laminated metal container made by a process comprising at least one of stretching, ironing and drawing of the resin film-laminated metal sheet according to claim 7.

19. A resin film-laminated metal container made by a process comprising at least one of stretching, ironing and drawing of the resin-film-laminated metal sheet according to claim 8.

20. A resin film-laminated metal container made by a process comprising at least one of stretching, ironing and drawing of the resin film-laminated metal sheet according to claim 9.

21. A resin film-laminated metal container made by a process comprising at least one of stretching, ironing and drawing of the resin film-laminated metal sheet according to claim 10.

22. A resin film-laminated metal container made by a process comprising at least one of stretching, ironing and drawing of the resin film-laminated metal sheet according to claim 4.

23. A resin film-laminated metal container made by a process comprising at least one of stretching, ironing and drawing of the resin film-laminated metal sheet according to claim 12.

24. A resin film-laminated metal container made by a process comprising at least one of stretching, ironing and drawing of the resin film-laminated metal sheet according to claim 13.

25. A resin film-laminated metal container according to claim 15, wherein said process comprises ironing or deep drawing.

26. A beverage can made of a resin film-laminated metal sheet according to claim 1.

27. A beverage can made of a resin film-laminated metal sheet according to claim 2.

28. A beverage can made of a resin film-laminated metal sheet according to claim 3.

29. A beverage can made of a resin film-laminated metal sheet according to claim 4.

30. A resin film-laminated metal sheet comprising a resin layer laminated on a metal sheet according to any one of claims 1–4, wherein the elastomer resin (B) has a glass transition temperature of no higher than 30° C. and the vinyl polymer (C) has a glass transition temperature of at least 30° C.

* * * * *

UNITED STATES PATENT AND TRADEMARK OFFICE
CERTIFICATE OF CORRECTION

PATENT NO.    : 6,783,825 B1    Page 1 of 1
DATED         : August 31, 2004
INVENTOR(S)   : Ohishi et al.

It is certified that error appears in the above-identified patent and that said Letters Patent is hereby corrected as shown below:

Column 12,
Line 59, change "metharcrylate" to -- methacrylate --.

Column 16,
Line 39, change "vinvl" to -- vinyl --.

Column 24,
Line 30, change "claim 4." to -- claim 11. --.

Signed and Sealed this

Twenty-fifth Day of October, 2005

JON W. DUDAS
*Director of the United States Patent and Trademark Office*